United States Patent Office 2,958,543
Patented Nov. 1, 1960

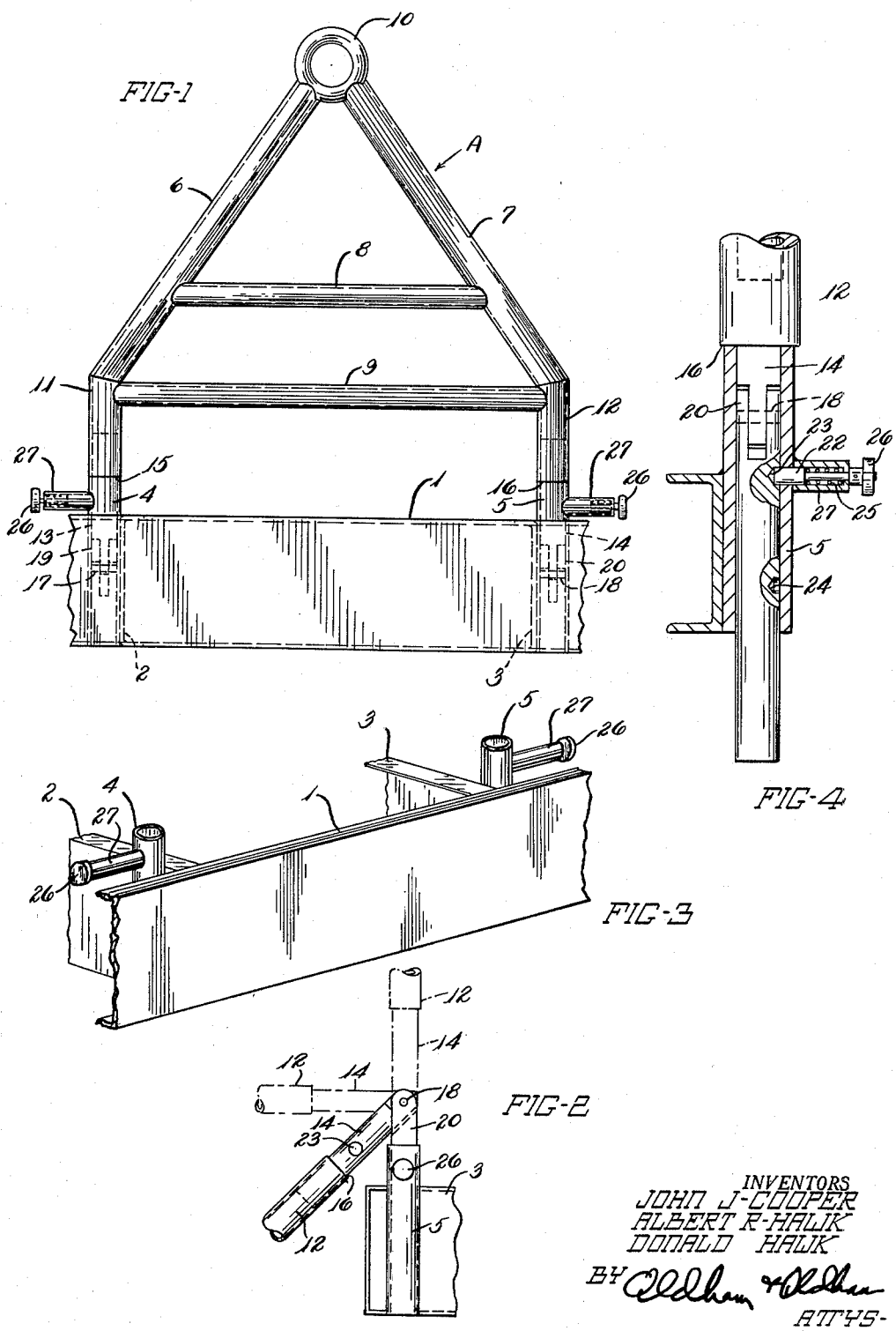

2,958,543
TOW GUARD FOR TRUCKS OR OTHER VEHICLES

John J. Cooper, 7512 Aberdeen St., and Albert R. Hawk and Donald Hawk, both of 8121 Pulaski St., all of Cleveland, Ohio, assignors, by direct and mesne assignments, of one-eighth to Sam Calderone, Yukon, one-eighth each to Ridsy Calderone, Jr., and John William Shivey, Bellevernon, one-eighth to Albert C. Tarquinio, Monessen, and one-eighth to Joseph R. Rygiel, Fayette City, Pa.

Filed Feb. 9, 1959, Ser. No. 791,986

7 Claims. (Cl. 280—491)

This invention relates to tow guards for trucks and more especially to devices for hitching a truck to another truck, tractor, or the like. The device of the invention is also useful as a guard when not in use for towing purposes. The article of the invention is particularly useful in hitching a heavy industrial truck to another truck or tractor when the one truck has had a mechanical breakdown but it may also be used to hitch any number of trucks to one another for any desired reason.

Where trucks are to be towed by tractors it is important that the hitch employed to connect the vehicles have not only longitudinal pulling capacity but it also have sufficient stiffness to keep the vehicles properly spaced. Also, it is highly desirable that the towed vehicle be self-steering.

It is an object of the invention to provide a towing hitch which may be positioned in a towing position or in a guard position.

Another object is to provide a towing hitch which may be hinged from one position to another or locked in the guard, or tow position.

Another object is to provide a towing hitch having lateral stability, and adopted to maintain a towed vehicle in a proper tracking relation to a towing vehicle.

These and other objects will appear from the following description and the accompanying drawings.

Of the drawings:

Fig. 1 is a front end view of a truck bumper or sill showing the towing hitch in its elevated or guard position secured to the truck frame, part of the bumper being broken away.

Fig. 2 is a side view taken from the right of Fig. 1 showing the towing boom in lowered position in full lines and in horizontal towing position and vertical guide positions in dot and dash lines, portions being broken away.

Fig. 3 is a perspective view of a portion of the end sill or bumper and portions of the longitudinal sills or frame of the truck with the socket members for receiving the boom secured thereto, portions being broken away.

Fig. 4 is an enlarged sectional detail view of one of the sockets and its boom support in its elevated position, showing the locking mechanism, parts being broken away.

Referring to the drawings, the numeral 1 designates a front bumper, end sill or bolster of a truck or other vehicle and the numerals 2, 3 longitudinal sills, or frame means of the vehicle secured to the end bolster or bumper 1.

For providing a towing hitch, a pair of vertically disposed cylindrical sockets 4, 5 are welded or otherwise secured to any desired portions of the sill members or the bumper in spaced apart parallel relation, one at each side of the truck and spaced equally from the central vertical plane of the truck. An A-shaped boom A is provided and comprises side frame members or standards 6, 7 and cross members 8, 9 of tubular material welded or otherwise secured together and to a towing ring, or equivalent member 10 at its apex, the base of the frame comprising parallel support members 11, 12 welded to the inclined side frame members 6 and 7 and spaced to correspond with sockets 4, 5. The boom A may be of any desired shape for ornamental purposes.

The support members 11, 12 terminate in dowel members 13, 14 of reduced diameter extending from shoulders 15, 16 for reception in sockets 4, 5 and these are hingedly secured as at 17, 18 to extensions 19, 20 fitting said sockets, the dowel members and their extensions having slot and tenoned hinge connections and being of the same diameter so that when the extensions only are in the sockets, the frame A may be hingedly moved as shown in Fig. 2 from a vertical position indicated in dot and dash lines to a horizontal position similarly shown or to a downwardly inclined position shown in full lines. The boom A is, of course, centered in the vehicle to which it is secured. In order to permit movement to the downwardly inclined position shown, the notch in the hinge joint is made deep enough and inclined as shown in Fig. 2. This permits dipping and lifting of the boom and avoids disconnection of the tow with variations in the road surface.

For securing the A-frame in the sockets, each socket is provided with a spring-pressed locking pin 22 laterally movable in a guide 27 so as to intersect the bore of a socket and to enter any of a plurality of vertically spaced locking openings 23, 24 formed in the extensions 19, 20. The pin 22 is held in place by a coil spring 25 and is manually retractable, a knob 26 being provided for withdrawing it.

As seen in Figs. 2 and 4, when the pin 22 is engaged in locking opening 23, shoulder 16 rests on socket 5, the dowel 14 is entered in the socket, and the hinge connection 18 is inoperative so that the boom is vertical and acts as a guard. With the pin 22 locked in opening 24, the hinge connection 18 will be above the socket 5 and the boom may be swung to a horizontal or inclined position where the ring 10 may engage over a towing post, C-clamp or other member on a tractor, truck or other towing vehicle. In the towing position the A-frame or boom presents a laterally stiff towing hitch to prevent undue side sway of the truck. In the vertical or guard position it serves as a bumper, or radiator guard for the truck.

In some instances it may be desirable to provide some type of closure means at or adjacent the bottoms of the cylindrical sockets 4 and 5 to limit vertical downward movement of the extensions 19 and 20 hingedly secured to the towing frame, or boom of the invention, in such sockets. In such instances, the use of lock pins and locking openings in these extensions 19 and 20 and associated parts could be completely avoided. It may be necessary to secure the extensions 19 and 20 to the sockets 5 and 6 when the frame A is in its towing, or operative position, so that safety members or lock pins may be desired at least for that assembly. Obviously any type of a lock pin and chain member, or equivalent can be used in place of the spring-pressed locking pins 22 of the invention in order to maintain the tow guard boom A in either its operative or inoperative position, as desired.

Obviously any conventional type of a towing member can be used in lieu of the ring member 10 shown in the drawings, and it is within the scope of the invention to use some type of a telescopically extensible towing bar that could be pulled out to extend from the guard frame A of the invention when such boom A is operatively positioned for towing action.

By laterally centering the towing member 10 in the boom A, a self-steering or tracking action is provided between the towed and towing vehicles when the boom A is operatively positioned. Thus no driver is required for the towed vehicle and this facilitates moving a truck having a mechanical breakdown to another spot for repair purposes.

It is believed that the tow guard and bar of the invention provides an effective, sturdy construction which is effective for radiator and grill protection action at all times when the tow boom A is positioned in its guard position, but with such boom A being readily movable into an operative position for towing action. As long as socket means, like the sockets 4 and 5, are provided on all vehicles of a fleet, the boom A assembly could be moved from one vehicle to another for towing action, as desired. The article of the invention is relatively low in cost and can be permanently attached to all vehicles of a truck fleet so that when any one truck breaks down, another truck of the fleet can readily be attached to the truck for temporary towing purposes. Thus it is believed that the objects of the invention have been achieved.

While a single embodiment of the invention has been shown and described, it will be apparent to those skilled in the art that modifications may be made without departing from the scope of the invention as it is defined by the following claims.

We claim:

1. A tow guard for a truck comprising an A-shaped boom having inclined standards joined by a towing ring at its apex and terminating in spaced apart parallel dowel portions for entering sockets on the frame of the truck, each dowel portion having an extension hingedly secured thereto by hinged connections, and means for locking said extensions within said sockets at a position where the hinged connections are above the sockets for hinging movement of the boom from a vertical to a horizontal position and also at a position where said hinged connections are within said sockets and the boom is held in a vertical position.

2. A tow guard for a truck as defined by claim 1 in which the dowel portions of the boom have stop shoulders limiting their entry into said sockets.

3. A tow guard for a truck as defined in claim 1 in which the dowel portion extensions have axially spaced lateral openings and said sockets have retractable spring pressed pins for locking engagement with said extensions.

4. In a truck having a frame, a pair of vertically disposed sockets on said frame in laterally spaced apart relation at an end of the truck, socket-engaging extension members engageable in said sockets, and being movable vertically with relation to said sockets, an A-shaped boom having a towing connection at its apex and having parallel spaced apart dowel portions hinged to said extensions and positionable in said sockets in alignment of said extensions, and means to selectively lock the extensions in said sockets to permit or prevent hinging movement of said boom, the action of said means being dependent upon the relative vertical positions of said socket-engaging extension members and said sockets, and with hinging movements of the boom being prevented when the socket-engaging extension members are in a fully engaged position in said sockets.

5. In a truck having a frame, a pair of vertically disposed sockets on said frame in laterally spaced apart relation at an end of the truck, socket-engaging extension members engageable in said sockets, an A-shaped boom having a towing connection at its apex and having parallel spaced apart dowel portions hinged to said extensions and positionable in said sockets in alignment of said extensions, and means to selectively lock the extensions in said sockets to permit or prevent hinging movement of said boom, the hinged connections of the dowel portions and the extensions comprising a hinged slot and tenon joint in which clearance is provided by a sloping slot for hinging of the boom below a horizontal position.

6. In a truck having frame means including a bumper, a pair of vertically disposed sockets secured to said frame means in laterally spaced apart relation adjacent the front end of the truck, socket engaging extension members telescopically received in said sockets, a boom member, and parallel spaced apart dowel portions fixedly secured to said boom member and hingedly connected to said extensions and slidably positionable in said sockets, said boom member having a towing connection positioned on the central axis thereof, said boom member being positioned in a vertically upwardly extending direction when said dowel portions and hinge means are positioned in said sockets, and being movable to a towing position when said dowel portions are slid vertically upwardly beyond said sockets.

7. In a truck having frame means including a bumper, a pair of vertically disposed sockets secured to said frame means in laterally spaced apart relation adjacent the front end of the truck, socket engaging extension members telescopically received in said sockets, a boom member, parallel spaced apart dowel portions fixedly secured to said boom member and hingedly connected to said extensions, said boom member having a towing connection positioned on the central axis thereof, said boom member being positioned in a towing position when swung forwardly about said extension members, and lock means engaging said extension members to prevent said extension members from moving out of engagement with said sockets.

References Cited in the file of this patent

UNITED STATES PATENTS

| | | |
|---|---|---|
| 307,593 | Robinson | Nov. 4, 1884 |
| 927,713 | Clausen | July 13, 1909 |
| 2,378,504 | Roos | June 19, 1945 |
| 2,880,016 | Peterson | Mar. 31, 1959 |